US011170922B2

(12) United States Patent
Nishimura et al.

(10) Patent No.: US 11,170,922 B2
(45) Date of Patent: Nov. 9, 2021

(54) COIL DEVICE AND HOLDER

(71) Applicant: IHI CORPORATION, Tokyo (JP)

(72) Inventors: Kenji Nishimura, Tokyo (JP); Susumu Tokura, Tokyo (JP); Jun Araki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 434 days.

(21) Appl. No.: 16/312,875

(22) PCT Filed: Aug. 30, 2017

(86) PCT No.: PCT/JP2017/031227
§ 371 (c)(1),
(2) Date: Dec. 21, 2018

(87) PCT Pub. No.: WO2018/043590
PCT Pub. Date: Mar. 8, 2018

(65) Prior Publication Data
US 2019/0326049 A1    Oct. 24, 2019

(30) Foreign Application Priority Data

Sep. 2, 2016 (JP) .............................. JP2016-171798

(51) Int. Cl.
*H01F 27/32* (2006.01)
*H01F 5/02* (2006.01)
(Continued)

(52) U.S. Cl.
CPC ............... *H01F 5/02* (2013.01); *H01F 27/06* (2013.01); *H01F 27/2823* (2013.01);
(Continued)

(58) Field of Classification Search
CPC ........ H01F 5/02; H01F 27/06; H01F 27/2823; H01F 27/2871; H01F 27/30; H01F 38/14;
(Continued)

(56) References Cited

U.S. PATENT DOCUMENTS 7,197,113 B1    3/2007  Katcha et al.
2008/0297295 A1  12/2008  Yamazaki et al.
(Continued)

FOREIGN PATENT DOCUMENTS

CN    101026033 A    8/2007
CN    101383215 A    3/2009
(Continued)

*Primary Examiner* — Mang Tin Bik Lian
(74) *Attorney, Agent, or Firm* — Volpe Koenig

(57) ABSTRACT

A coil device is provided with a coil and a holder which holds the coil. The coil is formed by a conductive wire being wound in a wound wire direction and includes a plurality of turns that are adjacent in a direction intersecting the wound wire direction. The holder includes a plurality of first holding portions that hold the conductive wire in such a way that the conductive wire passes along a plurality of first paths corresponding to the plurality of turns, and at least one second holding portion which holds the conductive wire in such a way that the conductive wire passes along a second path extending in a direction intersecting the wound wire direction and connecting the first paths.

8 Claims, 15 Drawing Sheets

(51) Int. Cl.
*H01F 27/06* (2006.01)
*H01F 27/28* (2006.01)
*H02J 50/10* (2016.01)
*H02J 7/02* (2016.01)
*B60L 50/50* (2019.01)

(52) U.S. Cl.
CPC ............... *B60L 50/50* (2019.02); *H02J 7/025* (2013.01); *H02J 50/10* (2016.02)

(58) Field of Classification Search
CPC ... B60L 50/50; B60L 5/00; H02J 50/10; H02J 7/025; Y02T 90/14; Y02T 10/7072; Y02T 10/70
See application file for complete search history.

(56) References Cited

U.S. PATENT DOCUMENTS

| | | | | |
|---|---|---|---|---|
| 2012/0049991 | A1* | 3/2012 | Baarman | H02J 50/12 336/199 |
| 2013/0293191 | A1* | 11/2013 | Hidaka | H02J 50/12 320/108 |
| 2014/0176288 | A1 | 6/2014 | Jung et al. | |
| 2015/0364244 | A1* | 12/2015 | Tsai | H01F 27/36 336/200 |
| 2016/0059714 | A1 | 3/2016 | Ngahu | |
| 2018/0141451 | A1* | 5/2018 | Totsuka | H01F 27/2871 |
| 2018/0261384 | A1* | 9/2018 | Tsai | H02J 7/0042 |

FOREIGN PATENT DOCUMENTS

| | | | |
|---|---|---|---|
| CN | 203086197 U | | 7/2013 |
| CN | 103887039 A | | 6/2014 |
| CN | 203706838 U | | 7/2014 |
| EP | 1998342 A2 | | 12/2008 |
| EP | 3002766 A1 | | 4/2016 |
| JP | 5-090922 U1 | | 12/1993 |
| JP | 09-074040 A | | 3/1997 |
| JP | 3106967 U | * | 11/2004 |
| JP | 3-106967 U | | 1/2005 |
| JP | 2005-159248 A | | 6/2005 |
| JP | 2007-165876 A | | 6/2007 |
| JP | 2014-212153 A | | 11/2014 |
| KR | 101275252 B1 | | 6/2013 |
| WO | 02/37641 A1 | | 5/2002 |

* cited by examiner

COIL DEVICE AND HOLDER

TECHNICAL FIELD

The present disclosure relates to a coil device and a holder.

BACKGROUND ART

A wireless power transfer system is provided with a power transmission coil as a part of a power transmission coil device and a power receiving coil as a part of a power receiving coil device. The wireless power transfer system realizes wireless power transmission by using inter-coil magnetic coupling such as electromagnetic induction and magnetic field resonance methods. The wireless power transfer system is applied to, for example, a power feeding system of an electric car or a plug-in hybrid car.

In the power transmission coil and the power receiving coil, the inductance value of the coil can vary with how a conductive wire is wound. The electric power transmitted between the coils can change when the inductance value of the coil changes. Accordingly, for each system, the optimum inductance value is determined from the viewpoint of transmission power. However, the inductance may change due to manufacturing variations or the like. In the related art, a technique for suppressing the change has been proposed as described in Patent Document 1.

In the device described in Patent Document 1, a plurality of guide portions are provided as a winding number adjustment mechanism (turn-back portion). The length of the coil-forming conductive wire is adjusted by the guide portion where the conductive wire is hooked being changed. Also, an extra length absorbing device is provided to absorb a change in the extra length of the conductive wire caused by conductive wire length adjustment. A first hook, a second hook, and a holding portion constitute the extra length absorbing device.

CITATION LIST

Patent Literature

Patent Document 1: Japanese Unexamined Patent Publication No. 2014-212153

SUMMARY OF INVENTION

Technical Problem

In the device described in Patent Document 1, it is necessary to provide the guide portion, the first hook, the second hook, and the holding portion in addition to a core and a coil wound around the core, and the number of parts increases for conductive wire winding adjustment. The present disclosure describes a coil device and a holder with which winding of a conductive wire can be adjusted and an increase in the number of parts can be suppressed.

Solution to Problem

A coil device according to an aspect of the present disclosure is provided with a coil and a holder holding the coil. The coil is formed by a conductive wire being wound in a wound wire direction and includes a plurality of turns adjacent in a direction intersecting the wound wire direction. The holder includes a plurality of first holding portions holding the conductive wire in such a way that the conductive wire passes along a plurality of first paths corresponding to the plurality of turns and at least one second holding portion holding the conductive wire in such a way that the conductive wire passes along a second path extending in a direction intersecting the wound wire direction and connecting the first paths.

Effects of Invention

According to an aspect of the present disclosure, it is possible to adjust winding of a conductive wire in a holder while suppressing an increase in the number of parts.

DESCRIPTION OF EMBODIMENTS

Figure 1:
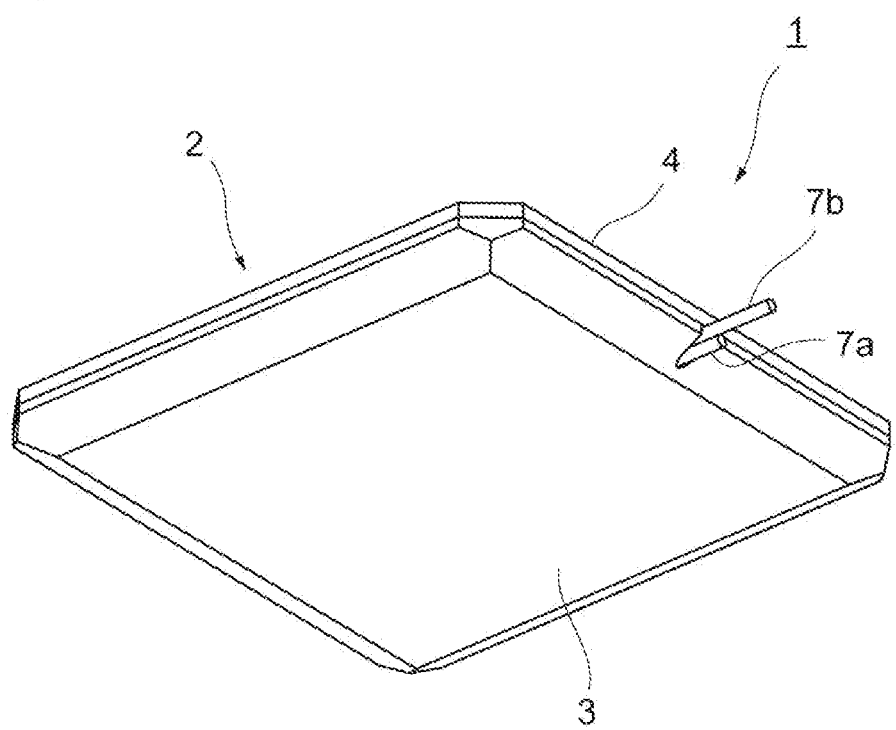
FIG. 1 is a perspective view illustrating a coil device according to a first embodiment of the present disclosure.

A coil device according to an aspect of the present disclosure is provided with a coil and a holder holding the coil. The coil is formed by a conductive wire being wound in a wound wire direction and includes a plurality of turns adjacent in a direction intersecting the wound wire direction. The holder includes a plurality of first holding portions holding the conductive wire in such a way that the conductive wire passes along a plurality of first paths corresponding to the plurality of turns and at least one second holding portion holding the conductive wire in such a way that the conductive wire passes along a second path extending in a direction intersecting the wound wire direction and connecting the first paths.

According to this coil device, the second path extends in a direction intersecting the wound wire direction and connects the adjacent first paths. Accordingly, the conductive wire passing through the first path may pass through the first path as it is or may branch from the first path and pass through the second path. As a result, it is possible to select a path approaching a desired inductance and hold the conductive wire in the holder. The path can be selected by the first holding portion and the second holding portion provided in the holder, and thus there is no need to provide an additional component outside the holder. Therefore, an increase in the number of parts can be suppressed and winding of the conductive wire can be adjusted in the holder.

In some aspects, the holder further includes a third holding portion holding the conductive wire in such a way that the conductive wire passes along a third path connecting a peripheral edge portion of the holder and the outermost first path closest to the peripheral edge portion among the plurality of first paths. The conductive wire can be drawn out through the third path regardless of whether the conductive wire passes through the second path. The position at which the conductive wire is drawn out can be aligned, and thus the configuration is simple.

In some aspects, the conductive wire is wound in opposite directions in two of the first paths adjacent to each other after passing along the second path. Once the conductive wire passes through the second path, a conductive wire part which should originally pass through the adjacent first path becomes left over. By the remaining conductive wire being wound in the opposite direction in the adjacent first path, the remainder of the conductive wire can be reduced. In addition, by the conductive wire being wound in the opposite direction in the adjacent first path, the magnetic fluxes generated from the conductive wire are canceled out, and then it is possible to block the magnetic flux from the remaining conductive wire from affecting power feeding performance.

In some aspects, the coil device further includes a nonmagnetic member disposed on a back surface side of the holder. The nonmagnetic member includes a fourth holding portion holding the conductive wire on a back surface side of the nonmagnetic member. The remainder of the conductive wire can be reduced by the fourth holding portion of the nonmagnetic member holding the remainder of the conductive wire. The fourth holding portion is provided on the back surface side, which is opposite to the second coil device that the coil device faces, and thus the magnetic flux of the conductive wire passing through the fourth holding portion is shielded by the nonmagnetic member and is unlikely to leak to the second coil device side. Accordingly, it is possible to block the magnetic flux from the conductive wire held in the fourth holding portion from affecting power feeding performance.

In some aspects, the fourth holding portion is provided in such a way that the conductive wire is capable of passing along a plurality of loop-shaped fourth paths. The nonmagnetic member further includes a fifth holding portion holding the conductive wire in such a way that the conductive wire passes along a fifth path connecting the plurality of fourth paths and a peripheral edge portion of the nonmagnetic member. Even in a case where the positions and the directions of the entrances and exits of both end portions of the conductive wire are different on the holder, an extra-length conductive wire can be held along the fourth paths of the nonmagnetic member. Also, by a path being devised based on a proper combination between the fourth and fifth paths, both end portions of the conductive wire can be drawn out from a fixed position direction. Therefore, it is possible to guide the conductive wire to a fixed position without separately ensuring an extra length accommodating space during terminal treatment (such as connectorization and terminal fixing) of the conductive wire drawn out from the coil device.

In some aspects, the holder includes a first groove as the first holding portion capable of receiving the conductive wire and a second groove as the second holding portion capable of receiving the conductive wire. The first groove and the second groove are formed on a surface side or the back surface side of the holder. The first groove and the second groove are directly provided in the holder as the first holding portion and the second holding portion. In other words, the holding portions holding the conductive wire are formed integrally with the holder. Accordingly, a member different from the holder (that is, a separate member) is unnecessary, and the number of necessary members can be reduced. It is possible to adjust winding of the conductive wire without an increase in the number of parts.

Another aspect of the present disclosure relates to a holder holding a coil including a conductive wire. The holder includes a plurality of first holding portions holding the conductive wire in such a way that the conductive wire passes along first paths corresponding to a plurality of turns adjacent in a direction intersecting a wound wire direction in which the conductive wire is wound and at least one second holding portion holding the conductive wire in such a way that the conductive wire passes along a second path extending in a direction intersecting the wound wire direction and connecting the first paths. The holder has the same action and effect as the coil device described above. In other words, it is possible to adjust winding of a conductive wire in a holder while suppressing an increase in the number of parts.

Hereinafter, embodiments of the present disclosure will be described with reference to accompanying drawings. In the description of the drawings, the same elements are denoted by the same reference numerals, and redundant description will be omitted.

First, a coil device 1 according to a first embodiment will be described with reference to FIGS. 1 and 2. The coil device 1 is used in a power receiving device or a power transmitter in a wireless power transfer system. The wireless power transfer system is a system for charging a battery mounted in a vehicle such as an electric car and a hybrid car. The coil device 1 may be used for both the power receiving device and the power transmitter.

In a case where the coil device 1 is used in the power receiving device, the coil device 1 as a power receiving coil device is fixed to, for example, the chassis of the vehicle. The battery is connected to the coil device 1 via a power receiving circuit, a charging circuit, or the like. In a case where the coil device 1 is used in the power transmitter, the coil device 1 as a power transmission coil device is fixed to, for example, a road surface. An external power source is connected to the coil device 1 via a power transmission circuit, a rectifier circuit, or the like.

The power transmission coil device and the power receiving coil device face each other in an upward-downward direction and internal coils are electromagnetically coupled to each other to form an electromagnetic coupling circuit. As a result, wireless power transfer is performed from the coil of the power transmission coil device to the coil of the power receiving coil device. In other words, the power receiving coil device wirelessly receives electric power from the power transmission coil device. The electromagnetic coupling circuit may be a circuit that performs power feeding by "electromagnetic induction" or may be a circuit that performs power feeding by "magnetic field resonance".

Figure 2:
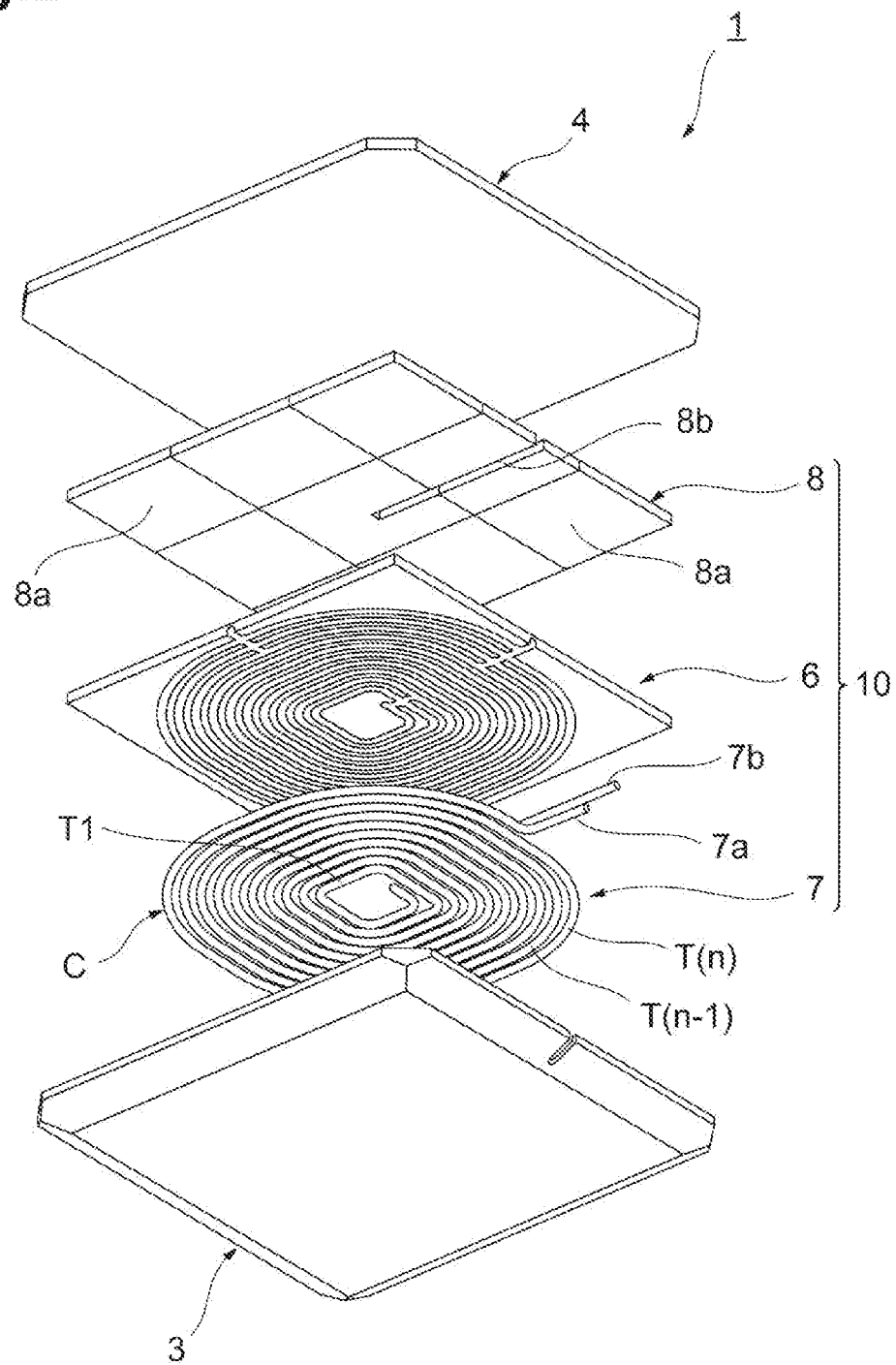
FIG. 2 is an exploded perspective view of the coil device illustrated in FIG. 1.

As illustrated in FIGS. 1 and 2, the coil device 1 has, for example, a flat shape. The coil device 1 is provided with a housing 2 and a coil portion 10 accommodated in the housing 2. The housing 2 includes a base 4 and a cover 3 fixed to the base 4.

The base 4 is a plate-shaped member disposed on the back surface side of the coil portion 10 and ensures the rigidity of the coil device 1 as a whole. The base 4 is made of, for example, an electrically conductive nonmagnetic material. The base 4 is a high-rigidity material and is made of a low-magnetic permeability metal (such as aluminum). As a result, the base 4 is capable of shielding a leakage flux outflow. In other words, the base 4 is an insulating plate.

The cover 3 is a box body disposed on the surface side of the coil portion 10 and protects the interior parts including the coil portion 10. The cover 3 is made of, for example, a magnetically permeable insulating material (such as glass fiber reinforced plastic (GFRP)). The cover 3 is a so-called exterior cover.

An accommodating space accommodating the coil portion 10 is formed by the cover 3 and the base 4. In a case where the coil device 1 is applied to both the power transmission coil device and the power receiving coil device, the cover 3 of a first coil device, which is one of the power transmission coil device and the power receiving coil device, and the cover 3 of a second coil device, which is the other of the power transmission coil device and the power receiving coil device, face each other with a predetermined separation distance. The base 4 of the first coil device and the base 4 of the second coil device are provided on the side opposite to the side facing the other coil device with respect to the respective coil portions 10. The base 4 is disposed on a side fixed to the vehicle or the road surface. In each of the flat portions of the coil device 1, the surface that is close to the other facing coil device will be referred to as a "surface" and the surface that is far from the other coil device, that is, the surface on the side opposite to the surface will be referred to as a "back surface".

The coil portion 10 is provided with a coil C including a conductive wire 7, a bobbin (holder, that is, coil holder) 6 holding the coil C, and a ferrite portion 8 disposed between the bobbin 6 and the base 4. The ferrite portion 8 is, for example, a rectangular flat plate-shaped ferrite core. The ferrite portion 8 is made of magnetic ferrite and determines the direction of and aggregates magnetic lines of force generated from the coil C. The ferrite portion 8 may be formed by a plurality of rectangular ferrite pieces 8a or may be formed by a single ferrite plate. The ferrite portion 8 may be substantially equal in size to the bobbin 6 or may be larger than the bobbin 6. The shape of the ferrite portion 8 is not limited to a rectangular shape (such as a square shape and an oblong shape) but may be another shape such as a circular shape.

The coil C is formed by the conductive wire 7 wound in, for example, a substantially rectangular spiral shape in the same plane. In a case where the coil C is provided in the power receiving device, the coil C generates an induced current. The coil C is a so-called circular type coil. In the circular coil, the conductive wire 7 is wound in a wound wire direction from the inside to the outside (or from the outside to the inside) so as to surround the winding axis. In this case, the wound wire direction is a direction extending in a spiral shape and is a direction along a virtual plane perpendicular to the winding axis. Used as an example of the conductive wire 7 is a litz wire in which a plurality of conductor wires insulated from each other are twisted together. A litz wire having a high skin effect is used as the conductive wire 7. The conductive wire 7 may be a single wire of copper or aluminum.

The bobbin 6 is a flat plate-shaped member that holds the conductive wire 7 by the conductive wire 7 being wound with respect to the bobbin 6. The bobbin 6 is made of a magnetically permeable insulating material (such as silicone and polyphenylene sulfide resin). In a case where the ferrite portion 8 is provided, the conductive wire 7 can be accommodated in a slit 8b formed at a part of the ferrite portion 8 as well. A holding structure of the conductive wire 7 in the coil portion 10 will be described in detail below.

Figure 3:
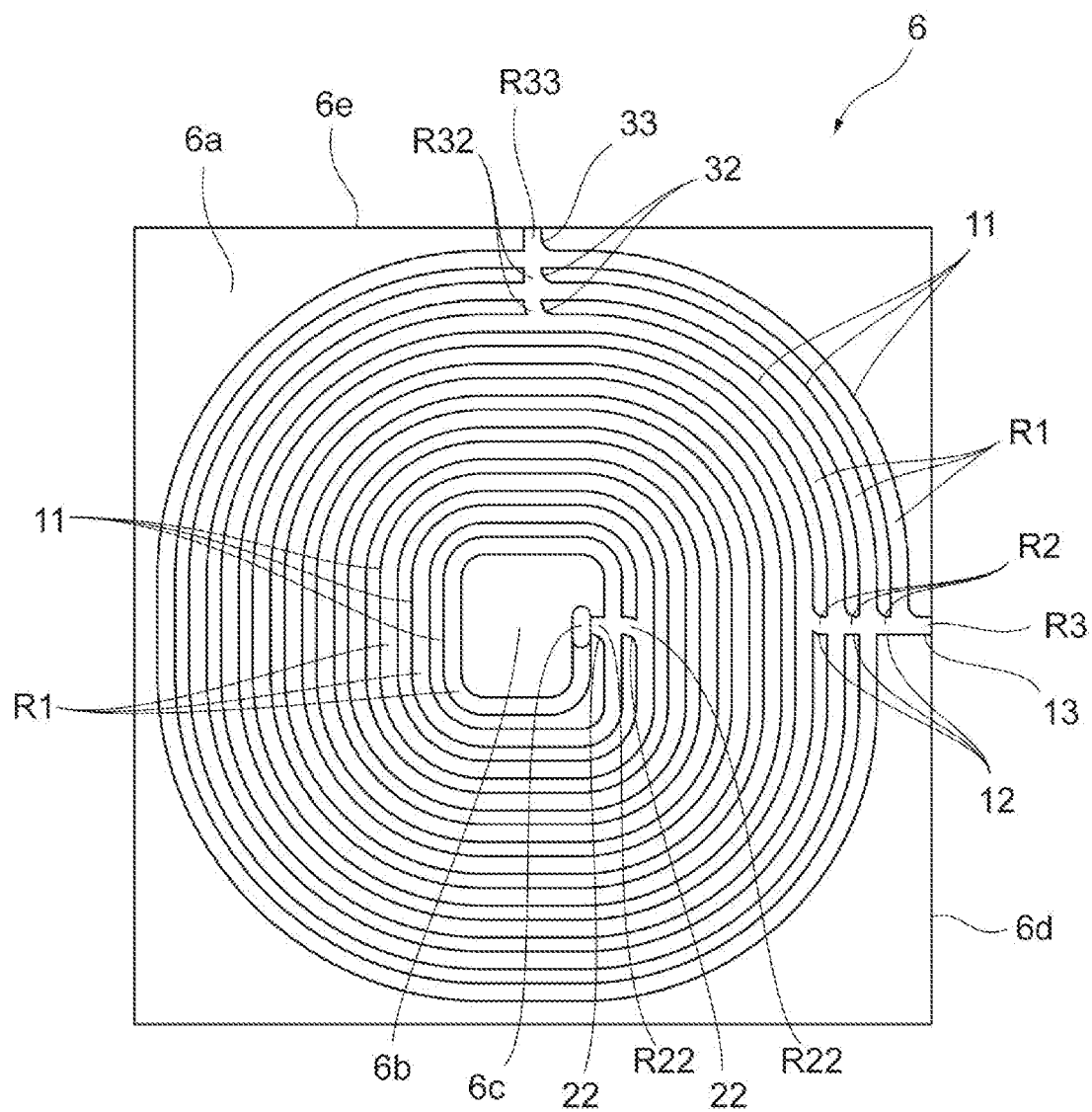
FIG. 3 is a plan view of a bobbin in FIG. 2.
Figure 5:
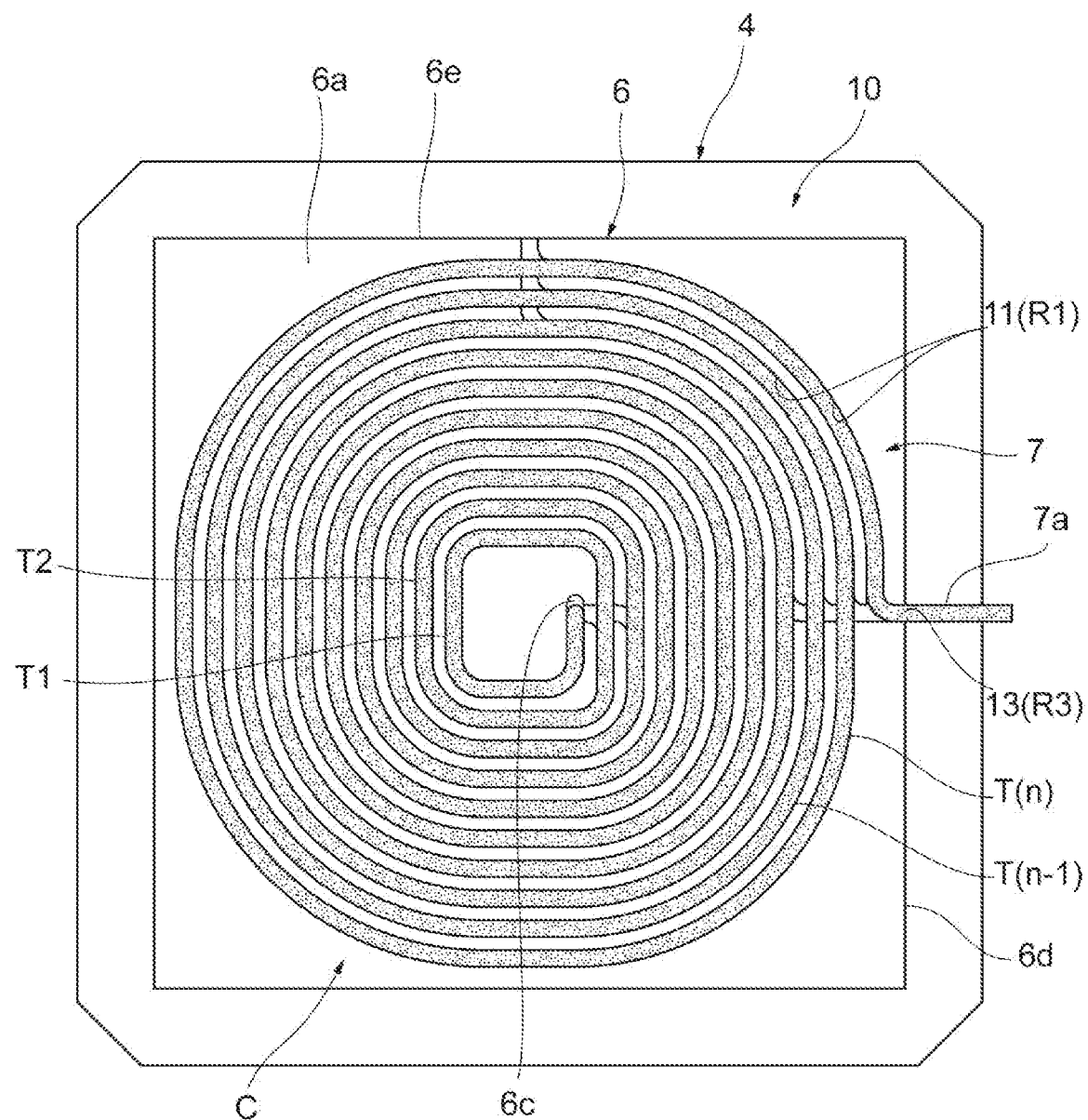
FIG. 5 is a plan view illustrating a first configuration example of a coil portion.

In the coil device 1, the path and the length of the conductive wire 7 can be freely adjusted on the bobbin 6, and the inductance value can be adjusted as a result. As illustrated in FIGS. 3 and 5, the bobbin 6 includes a plurality of first grooves 11 formed on a surface 6a side. As illustrated in FIG. 5, the coil C includes a plurality of turns T1, T2, ..., T(n−1), and T(n) formed by the conductive wire 7 being wound in the wound wire direction (n being a natural number of 2 or more). The plurality of turns T1, T2, ..., T(n−1), and T(n) are concentrically formed around the winding axis and are continuous with each other. In the circular type coil C, the plurality of turns T1, T2, ..., T(n−1), and T(n) form a spiral shape. The plurality of first grooves 11 are a first holding portion holding the conductive wire 7 in such a way that the conductive wire 7 passes along a plurality of first paths R1 (spiral paths) corresponding to the plurality of turns T1, T2, ..., T(n−1), and T(n).

Figure 6:
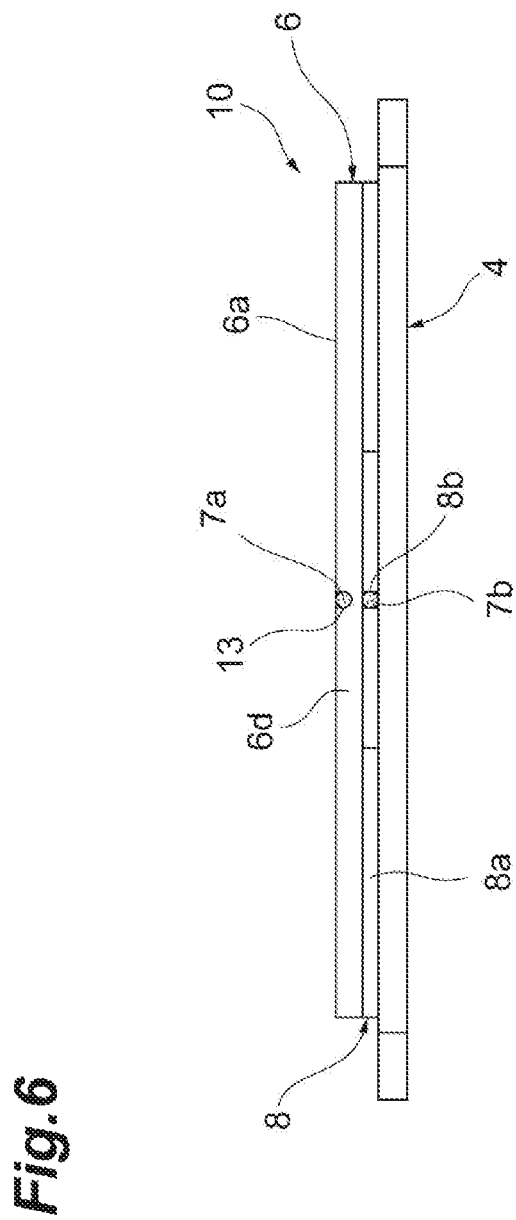
FIG. 6 is a side view of the first configuration example illustrated in FIG. 5.

More specifically, each first groove 11 has a columnar shape and has a size and a shape allowing the entire conductive wire 7 to be accommodated in a cross section perpendicular to the wound wire direction (see FIG. 6). In other words, the depth and the width of the first groove 11 are larger than the thickness (diameter) of the conductive wire 7. The first groove 11 may be capable of accommodating a part of the outer periphery of the conductive wire 7. For example, the first groove 11 may have a semi-cylindrical shape in which approximately half of the conductive wire 7 can be accommodated. The first groove 11 has only to be capable of holding the conductive wire 7 by capable of receiving the conductive wire 7 in part or in whole.

The plurality of first grooves 11 are adjacent to each other in a direction traversing the wound wire direction (direction orthogonal to the wound wire direction and the winding axis direction). In other words, the plurality of first grooves 11 are adjacent to each other in the radial direction with respect to the winding axis. A predetermined gap is provided between two adjacent first grooves 11. In other words, a plurality of partition wall portions 6f (see FIG. 4) constituting the gaps are provided between the adjacent first grooves 11. The height of each partition wall portion 6f is, for example, equal to the height of the surface 6a. Here, the "height" is a size in the winding axis direction, that is, a size in the facing direction of the coil device 1 described above.

The conductive wire 7 is held by the surface 6a and forms the plurality of turns T1, T2, ..., T(n−1), and T(n) by the conductive wire 7 being disposed and fitted in the first grooves 11. In this manner, the plurality of first grooves 11 themselves form the first path R1.

The first groove 11 is formed over the region from a middle portion 6b to the vicinity of the peripheral edge portion of the surface 6a. The middle portion 6b may include a region where the first groove 11 is not formed. In the middle portion 6b, a middle through hole 6c through which the conductive wire 7 is capable of passing is formed on the side closer to a first side surface 6d. The middle through hole 6c is, for example, a long hole having a width slightly larger than the thickness (diameter) of the conductive wire 7 and a length larger than the width.

Figure 4:
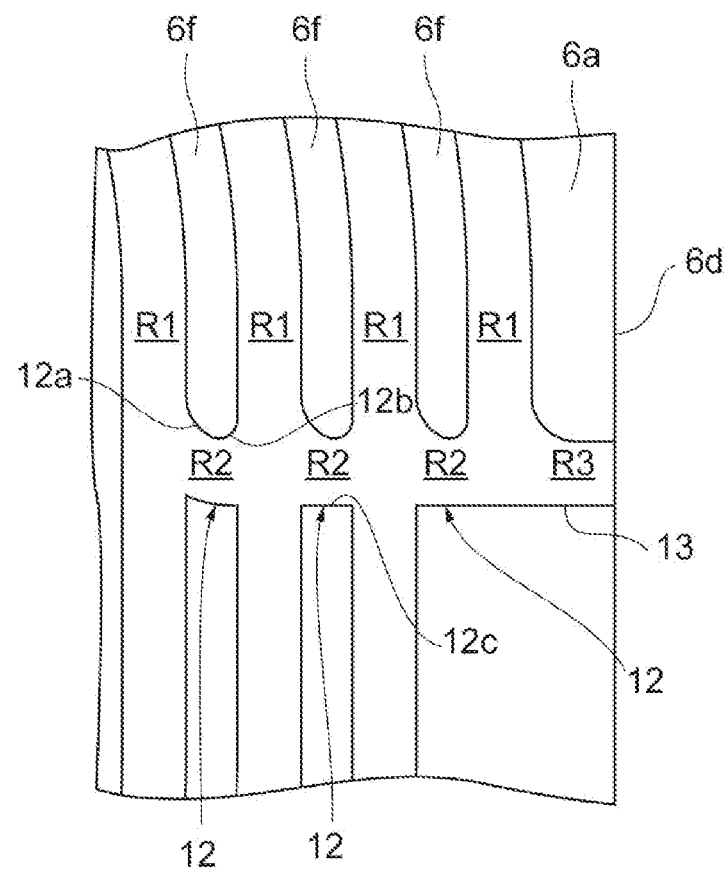
FIG. 4 is an enlarged plan view illustrating a peripheral portion of a second groove in FIG. 3.

As illustrated in FIGS. 3 and 4, the bobbin 6 includes a plurality of second grooves 12 formed on the surface 6a side and connecting the plurality of first grooves 11. More specifically, the bobbin 6 includes one second groove 12 connecting the first groove 11 corresponding to the outermost turn T(n) and the first groove 11 corresponding to the turn T(n−1) next to the turn T(n) (second turn positioned on the inner peripheral side). The bobbin 6 includes one second groove 12 connecting the first groove 11 corresponding to the second turn T(n−1) and the first groove 11 corresponding to the third turn next to the second turn T(n−1). The bobbin 6 includes one second groove 12 connecting the first groove 11 corresponding to the third turn and the first groove 11 corresponding to the fourth turn.

The second grooves 12 are disposed on a straight line and are continuous in the radial direction. The second grooves 12 are a second holding portion holding the conductive wire 7 in such a way that the conductive wire 7 passes along a second path R2 connecting the first paths R1. The second groove 12 is a release groove of the conductive wire 7. The second groove 12 enables inductance adjustment in the coil device 1.

In addition, the bobbin 6 includes one third groove 13 connecting the first side surface 6d and the outermost first groove 11 that is closest to the first side surface 6d, which is the peripheral edge portion of the bobbin 6. The third groove 13 is a third holding portion holding the conductive wire 7 in such a way that the conductive wire 7 passes along a third path R3 connecting the outermost first path R1 and the peripheral edge portion of the bobbin 6. The third groove 13 is a drawing groove of the conductive wire 7.

The third groove 13 and the plurality of second grooves 12 are disposed on a straight line and are continuous in the radial direction. The single groove that is formed by the third groove 13 and the plurality of second grooves 12 being continuous extends, for example, to be orthogonal to the first side surface 6d. In this manner, the plurality of second grooves 12 and the third groove 13 themselves form the second path R2 and the third path R3, respectively. The cross-sectional shapes and the sizes of the second groove 12 and the third groove 13 may be the same as those of the above-described first groove 11.

The second groove 12 forming the second path R2 will be described in more detail below. As illustrated in FIG. 4, the second groove 12 includes a first curved portion 12a that communicates with a relatively large curvature radius with respect to the first groove 11 (first path R1) on the inner peripheral side of the second groove 12. The second groove 12 includes a second curved portion 12b that communicates with a relatively small curvature radius with respect to the first groove 11 (first path R1) on the outer peripheral side of the second groove 12. The curvature radius of the first curved portion 12a is larger than the curvature radius of the second curved portion 12b. In other words, the first curved portion 12a has a gentler curve than the second curved portion 12b. The first curved portion 12a and the second curved portion 12b provided in the intersecting portion (communication portion) of the second groove 12 with respect to the first groove 11 are provided in the wall portion on the side that is close to the middle through hole 6c on the first path R1 continuous in a spiral shape. The second groove 12 includes a substantially linear flat portion 12c in the wall portion on the side that is far from the middle through hole 6c on the first path R1. The first curved portion 12a and the second curved portion 12b guide the conductive wire 7 in a case where the conductive wire 7 is folded back after passing through the second groove 12 (see FIG. 8A).

The bobbin 6 includes a plurality of second grooves 22 formed on the surface 6a side and connecting the plurality of first grooves 11. More specifically, the bobbin 6 includes one second groove 22 connecting the middle through hole 6c communicating with the first groove 11 corresponding to the innermost turn T1 and the first groove 11 corresponding to the turn T2 next to the turn T1 (second turn positioned on the outer peripheral side). The bobbin 6 includes one second groove 22 connecting the first groove 11 corresponding to the second turn T2 and the first groove 11 corresponding to the third turn next to the second turn T2. The second grooves 22 are disposed on a straight line and are continuous in the radial direction. The second grooves 22 are a second holding portion holding the conductive wire 7 in such a way that the conductive wire 7 passes along a second path R22 connecting the first paths R1. The second groove 22 is a release groove of the conductive wire 7. In this manner, the plurality of second grooves 22 themselves form the second path R22. The cross-sectional shape and the size of the second groove 22 may be the same as those of the above-described first groove 11. The second groove 22 enables fine inductance adjustment in the coil device 1.

The bobbin 6 includes a plurality of second grooves 32 formed on the surface 6a side and at positions circumferentially shifted from the second groove 12 and connecting the plurality of first grooves 11. More specifically, the bobbin 6 includes one second groove 32 connecting the first groove 11 corresponding to the outermost turn T(n) and the first groove 11 corresponding to the turn T(n−1) next to the turn T(n) (second turn positioned on the inner peripheral side). The bobbin 6 includes one second groove 32 connecting the first groove 11 corresponding to the second turn T(n−1) and the first groove 11 corresponding to the third turn next to the second turn T(n−1).

The second grooves 32 are disposed on a straight line and are continuous in the radial direction. The second groove 32 is formed at, for example, a position circumferentially shifted by 90 degrees from the second groove 12. The second grooves 32 are a second holding portion holding the conductive wire 7 in such a way that the conductive wire 7 passes along a second path R32 connecting the first paths R1. The second groove 32 is a release groove of the conductive wire 7. The second groove 32 enables the conductive wire 7 folded back at the second groove 12 to branch from the first groove 11.

In addition, the bobbin 6 includes one third groove 33 connecting a second side surface 6e and the outermost first groove 11 that is closest to the second side surface 6e, which is the peripheral edge portion of the bobbin 6. The third groove 33 is a third holding portion holding the conductive wire 7 in such a way that the conductive wire 7 passes along the third path R3 connecting the outermost first path R1 and the peripheral edge portion of the bobbin 6. The third groove 33 is a drawing groove of the conductive wire 7. The third groove 33 enables the conductive wire 7 folded back at the second groove 12 to be drawn out to the second side surface 6e side.

The third groove 33 and the plurality of second grooves 32 are disposed on a straight line and are continuous in the radial direction. The single groove that is formed by the third groove 33 and the plurality of second grooves 32 being continuous extends, for example, to be orthogonal to the second side surface 6e. In this manner, the plurality of second grooves 32 and the third groove 33 themselves form the second path R32 and a third path R33, respectively. The cross-sectional shapes and the sizes of the second groove 32 and the third groove 33 may be the same as those of the above-described first groove 11.

A curved portion similar to the above-described first curved portion 12a and second curved portion 12b is also provided in the intersecting portion of the second groove 22 with respect to the first groove 11. A curved portion similar to the above-described first curved portion 12a and second curved portion 12b is also provided in the intersecting portions of the second groove 32 and the third groove 33 with respect to the first groove 11. However, these curved portions are provided in the wall portion on the side that is far from the middle through hole 6c on the first path R1 continuous in a spiral shape.

In the bobbin 6 configured as described above, the path and the length of the conductive wire 7 held by the bobbin 6 can be freely adjusted. In other words, the plurality of first paths R1 and the plurality of second paths R2 are connected as described above, and thus the conductive wire 7 can be wound via not only the first path R1 along the wound wire direction but also the second path R2 so as to deviate from the wound wire direction.

For example, as in the coil portion 10 illustrated in FIG. 5, the conductive wire 7 can be wound so as not to pass through the second groove 12 (second path R2). In that case, a first end portion 7a of the conductive wire 7 is drawn out through the third groove 13. A second end portion 7b of the conductive wire 7 is drawn out from the first side surface 6d side through the middle through hole 6c and the slit 8b (see FIG. 6) of the ferrite portion 8. Since the position of the third groove 13 and the position of the slit 8b are aligned, the first end portion 7a and the second end portion 7b are drawn out from the same position.

Figure 7:
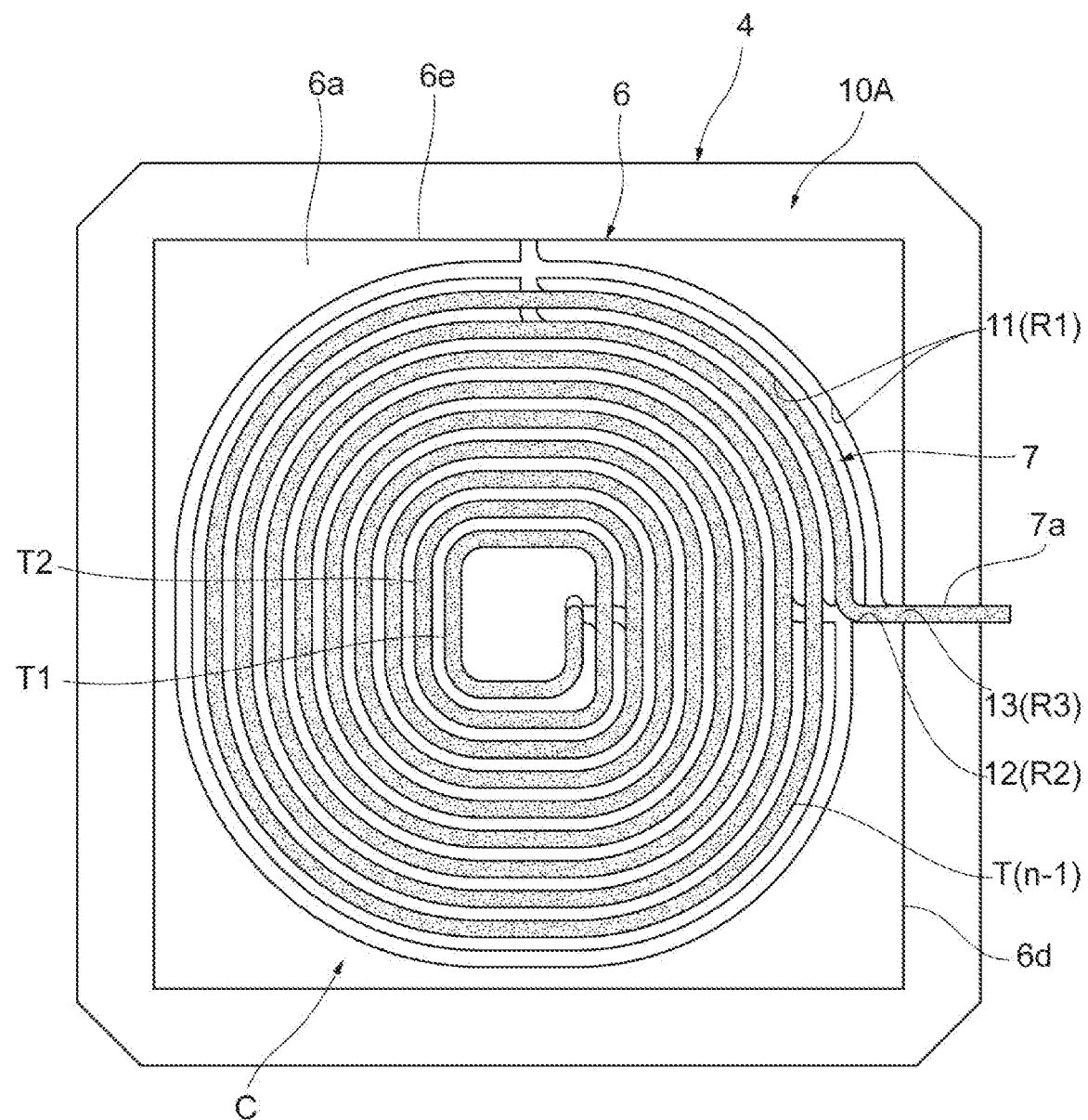
FIG. 7 is a plan view illustrating a second configuration example of the coil portion.

As in a coil portion 10A illustrated in FIG. 7, the conductive wire 7 can be wound so as to branch from the first path R1 without forming the turn T(n) and pass through the second groove 12 after forming the turn T(n−1). The conductive wire 7 is not wound in the outermost first groove 11. Even in this case, the first end portion 7a of the conductive wire 7 is drawn out through the third groove 13. As in the coil portion 10, the second end portion 7b of the conductive wire 7 is drawn out from the first side surface 6d side through the slit 8b of the ferrite portion 8.

According to the coil device 1 of the present embodiment, the second path R2 extends in a direction intersecting the wound wire direction and connects the adjacent first paths R1. Accordingly, the conductive wire 7 passing through the first path R1 may pass through the first path R1 as it is or may branch from the first path R1 and pass through the second path R2. As a result, it is possible to select a path approaching a desired inductance and hold the conductive wire 7 in the bobbin 6. The path can be selected by the first groove 11 and the second groove 12 provided in the bobbin 6, and thus there is no need to provide an additional component outside the bobbin 6. Therefore, an increase in the number of parts is suppressed and winding of the conductive wire 7 is adjusted in the bobbin 6. As a result, a change in inductance attributable to manufacturing variations and the like can be suppressed and equalization can be achieved.

In the device described in Patent Document 1, the guide portion, the first hook, the second hook, and the holding portion require a separate storage space to be put into a coil unit, and then an increase in appearance dimension (vertical and horizontal heights) ensues. This leads to an increase in device size. In addition, since the second hook is a movable part, the second hook is inferior in terms of long-term strength, vibration resistance by environment, and so on. In the coil device 1 of the present embodiment, in contrast, winding of the conductive wire 7 can be adjusted within the range of the bobbin 6, and thus compactness is achieved. In addition, the coil device 1 is provided with no movable part, and thus it is advantageous from the viewpoint of vibration resistance as well.

In the device described in Patent Document 1, it is unclear whether the core around which the conductive wire is wound and the guide portion are integrated or separate. In a case where the core and the guide portion are separate bodies, an adhesive member is necessary for adhesion between the separate bodies. In the coil device 1 of the present embodiment, the holding portions such as the first groove 11 and the second groove 12 are integrally formed in the bobbin 6, and thus the adhesive member is unnecessary and the number of necessary members can be reduced.

As illustrated in FIGS. 5 and 7, in the coil device 1, the conductive wire 7 can be drawn out through the third path R3 regardless of whether the conductive wire 7 passes through the second path R2. The position at which the conductive wire 7 is drawn out can be aligned, and thus the configuration is simple.

In the device described in Patent Document 1, how to draw out the conductive wire depends on which of the guide portions the conductive wire passes. Accordingly, the conductive wire cannot but be drawn out in a complex way and the conductive wire path from the guide portion to the second hook becomes longer as the selected guide portion is farther from the first hook. Leakage magnetic field and electric power loss may increase as a result. According to the coil device 1 of the present embodiment, the third groove 13 is provided in the bobbin 6, and thus the way in which the conductive wire 7 is drawn out is unified and simple. Leakage magnetic field and electric power loss can be suppressed.

In the coil device 1, the first groove 11 and the second groove 12 are directly provided in the bobbin 6 as the first holding portion and the second holding portion. In other words, the holding portions holding the conductive wire 7 are formed integrally with the bobbin 6. Accordingly, a member different from the bobbin 6 (that is, a separate member) is unnecessary, and the number of necessary members can be reduced. It is possible to adjust winding of the conductive wire 7 without an increase in the number of parts.

The second groove 22 is provided in the vicinity of the middle through hole 6c as well, and thus fine inductance adjustment can be performed by means of the second groove 22. Although the second groove 12 on the outer peripheral side has a greater inductance adjustment effect, the second groove 22 on the inner peripheral side also may be used for inductance adjustment.

Figure 8A:
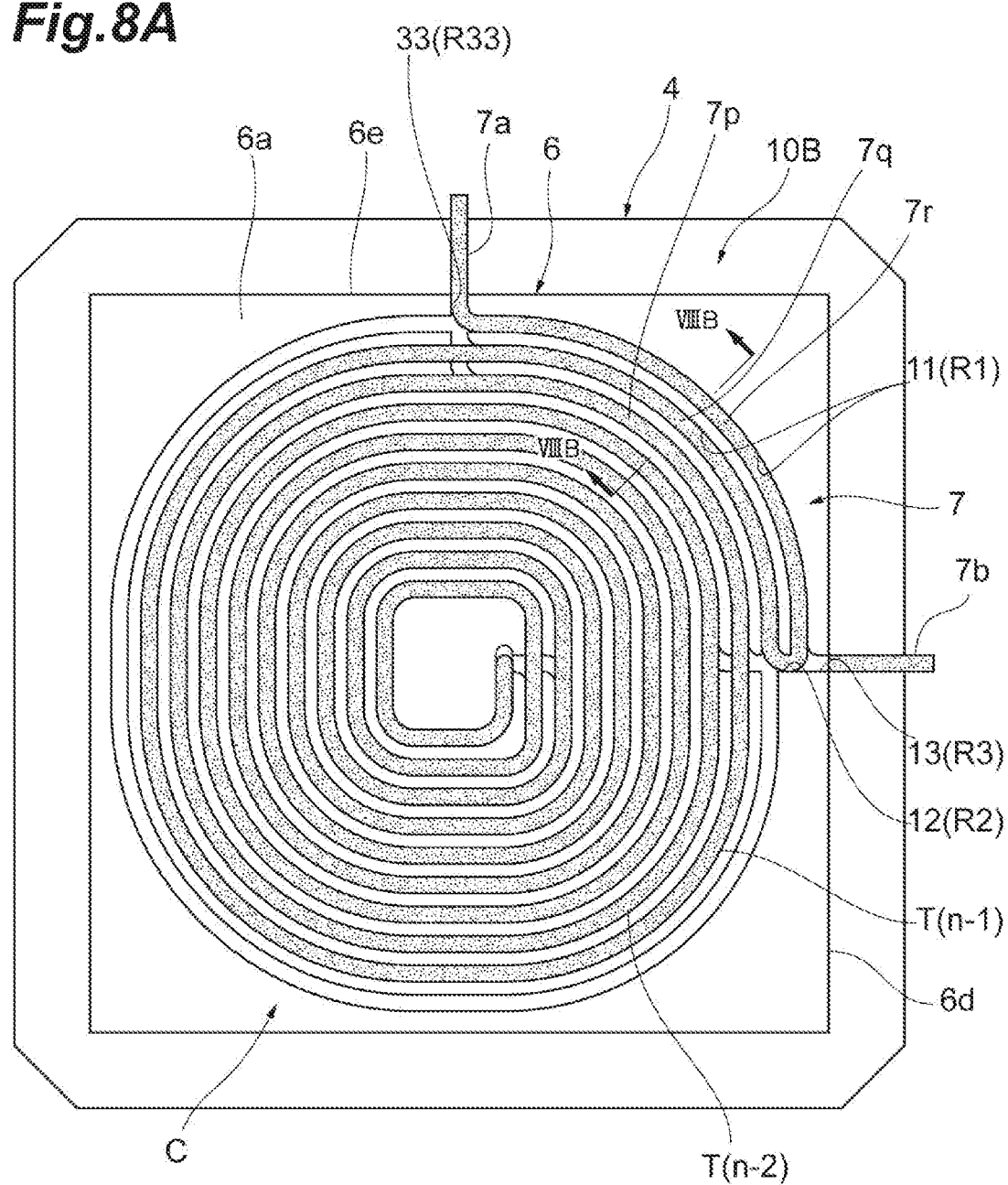
FIG. 8A is a plan view illustrating a third configuration example of the coil portion.
Figure 8B:
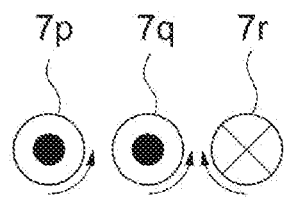
FIG. 8B is a diagram illustrating the current and magnetic flux directions in the cross section taken along line VIIIB-VIIIB of FIG. 8A.

Various configuration examples different from the coil portion 10 and the coil portion 10A can be realized according to the coil device 1. For example, as illustrated in FIG. 8A, a coil portion 10B may be adopted in which the conductive wire 7 that has passed through the second groove 12 (second path R2) is wound in opposite directions in two adjacent first grooves 11 (two first paths R1). In the coil portion 10B, the conductive wire 7 can be wound so as to branch from the first path R1 without forming the turn T(n) and pass through the second groove 12 after forming the turn T(n−1). In addition, the conductive wire 7 is wound in the opposite direction in the outermost first groove 11, and the first end portion 7a is drawn out through the third groove 33. As a result, a second extending portion 7q of the turn T(n−1) and a folded-back third extending portion 7r extending in the 90-degree range between the second groove 12 and the third groove 33 have different current directions. In other words, as illustrated in FIG. 8B, the second extending portion 7q and the third extending portion 7r have opposite current directions whereas the second extending portion 7q and a first extending portion 7p of the turn T(n−2) extending in the 90-degree range between the second groove 12 and the third groove 33 have the same current direction. In a case where an alternating current flows through the conductive wire 7, the above relationship (relationship illustrated in FIG. 8B) is established at a certain moment. As a result, the magnetic fluxes of the adjacent wires cancel each other out.

Once the conductive wire 7 passes through the second path R2, a conductive wire part which should originally pass through the adjacent first path R1 becomes left over. By the remaining conductive wire 7 being wound in the opposite direction in the adjacent first path R1, the remainder of the conductive wire 7 (length protruding from the bobbin 6) can be reduced. In addition, by the conductive wire 7 being wound in the opposite direction in the adjacent first path R1, the magnetic fluxes generated from the conductive wire 7 are canceled out, and then it is possible to block the magnetic flux from the remaining conductive wire 7 from affecting power feeding performance. In the coil portion 10B, the second extending portion 7q and the third extending portion 7r correspond to the remaining part of the conductive wire 7 wound around the bobbin 6.

Figure 9B:
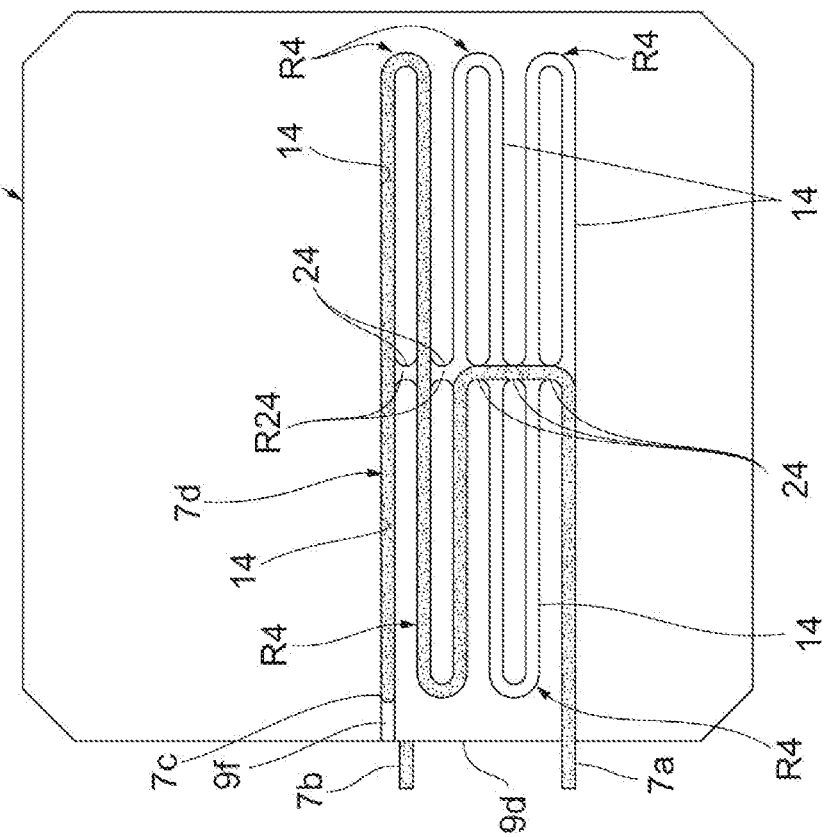
FIG. 9B is a bottom view of the configuration example illustrated in FIG. 9A.
Figure 9A:
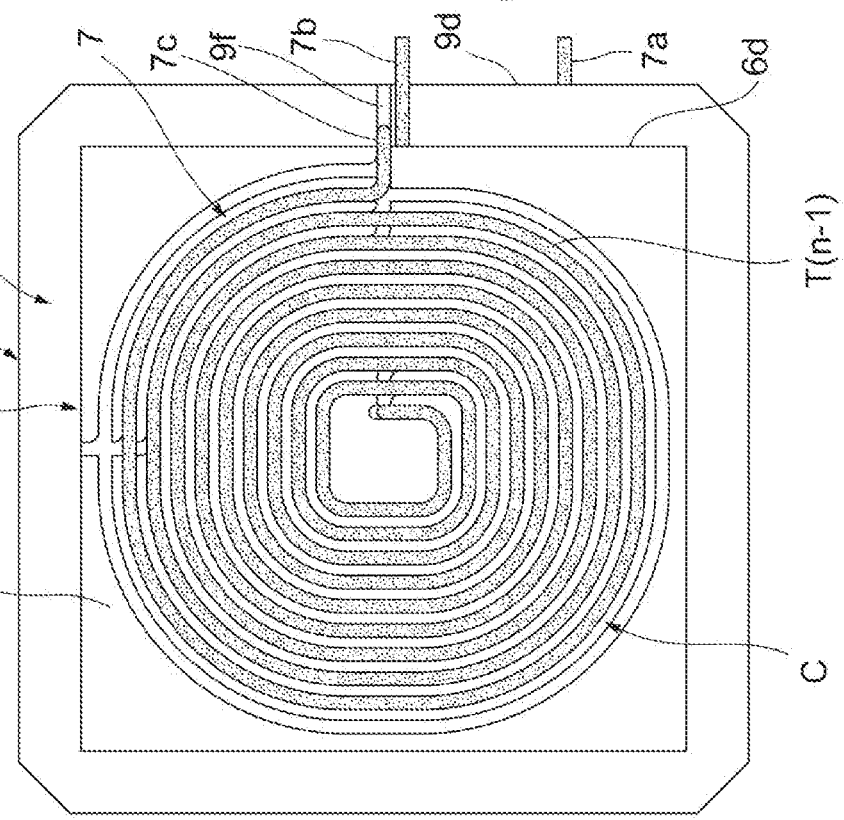
FIG. 9A is a plan view illustrating a configuration example of a coil portion according to a second embodiment.

A coil portion 10C of a coil device according to a second embodiment will be described below. As illustrated in FIGS. 9A and 9B, the coil portion 10C includes a shield plate (nonmagnetic member) 9C disposed on the back surface side of the bobbin 6. The shield plate 9C is made of an electrically conductive nonmagnetic material. The shield plate 9C is made of, for example, an aluminum plate or a copper plate. The shield plate 9C includes a fourth groove 14 on the back surface side of the shield plate 9C, and the fourth groove 14 is a fourth holding portion that holds the conductive wire 7. Provided on the back surface side of the shield plate 9C are a plurality of the fourth grooves 14 folded in a U shape and a plurality of connection grooves 24 connecting the plurality of fourth grooves 14. One of the fourth grooves 14 reaches a first side surface 9d, and another fourth groove 14 reaches the first side surface 9d at a position different from the fourth groove 14. In other words, the fourth groove 14 and the connection groove 24 are fourth holding portions that hold the conductive wire 7 in such a way that the conductive wire 7 passes along a fourth path R4 and a connection path R24, respectively.

Figure 10:
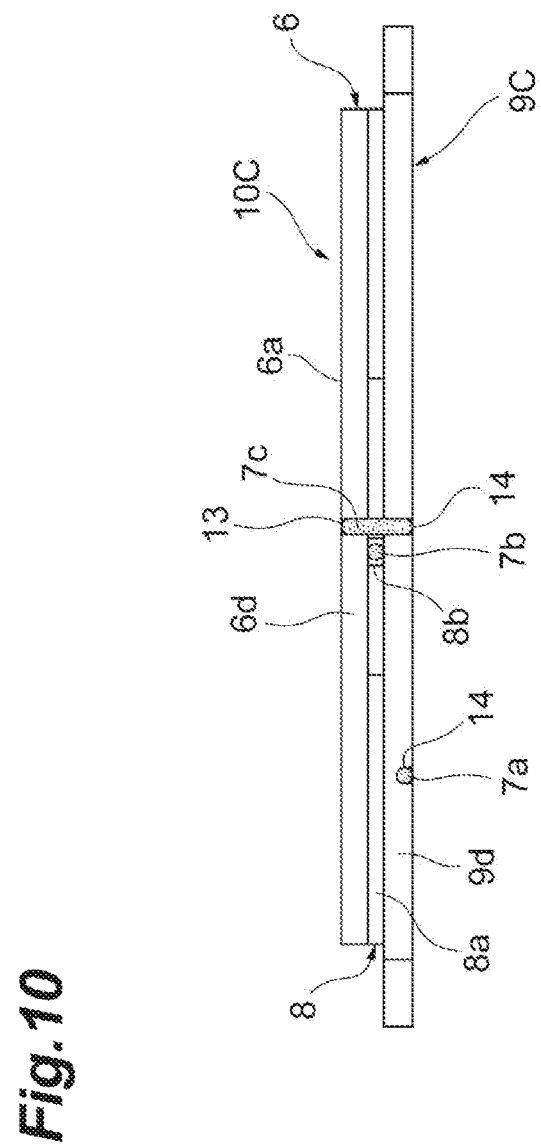
FIG. 10 is a side view of the configuration example illustrated in FIGS. 9A and 9B.

Also by the coil portion 10C, the path of the conductive wire 7 can be freely adjusted on the back surface of the shield plate 9C. For example, the conductive wire 7 goes around to the back surface side of the shield plate 9C through a slit 9f formed in the first side surface 9d of the shield plate 9C after bypassing the outermost first groove 11 (slit 9f being at the same position as the third groove 13 of the bobbin 6). The slit 9f communicates with the fourth groove 14 on the back surface side. A part of the conductive wire 7 passing through the slit 9f is a front-back inverted portion 7c. In addition, after passing through two U-shaped fourth grooves 14, the conductive wire 7 passes through three connection grooves 24 and is drawn out from the first side surface 9d through the other fourth groove 14. The second end portion 7b is drawn out from the first side surface 6d side through the slit 8b of the ferrite portion 8. Since the position of the third groove 13, that is, the position of the slit 9f and the position of the slit 8b are somewhat shifted, interference between the front-back inverted portion 7c and the second end portion 7b is avoided (see FIG. 10).

The coil portion 10C has the same action and effect as in the first embodiment. Further, the remainder of the conductive wire 7 can be reduced by the fourth holding portion of the shield plate 9C holding the remainder of the conductive wire 7. The fourth holding portion is provided on the back surface side, which is opposite to the second coil device that the coil device faces, and thus the magnetic flux of the conductive wire 7 passing through the fourth holding portion is shielded by the shield plate 9C and is unlikely to leak to the second coil device side. Accordingly, it is possible to block the magnetic flux from the conductive wire 7 held in the fourth holding portion from affecting power feeding performance.

Due to the characteristics of the coil device, the conductive wire 7 needs to have a certain length or more for the purpose of constant adjustment attributable to mid-assembly variations. Still, the fourth holding portion of the shield plate 9 is effective as means for hiding the extra length of the conductive wire 7.

Figure 11:
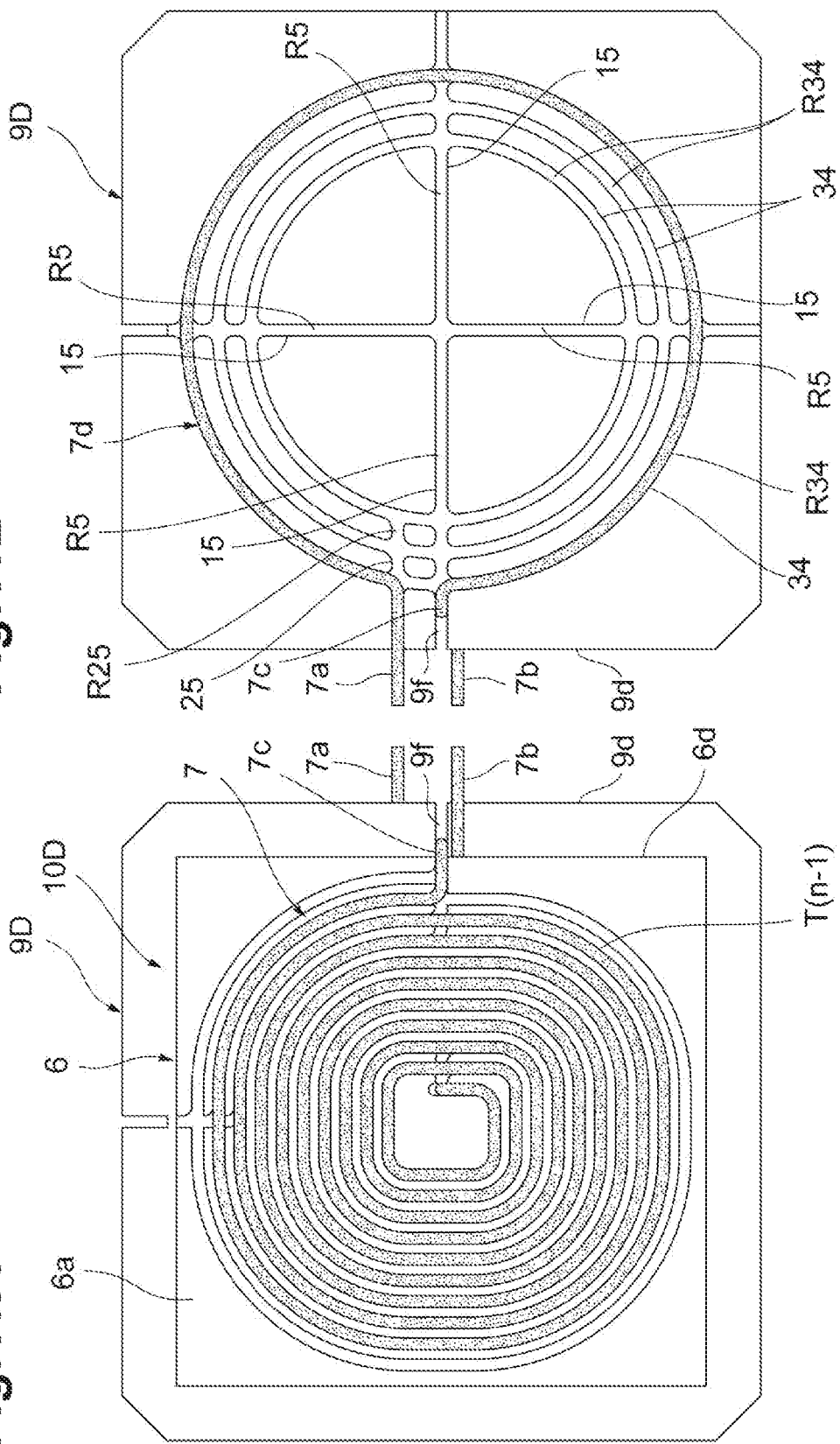
FIG. 11A is a plan view illustrating a first configuration example of a coil portion according to a third embodiment.
FIG. 11B is a bottom view of the first configuration example illustrated in FIG. 11A.

A coil portion 10D of a coil device according to a third embodiment will be described below. As illustrated in FIGS. 11A and 11B, the coil portion 10D includes a shield plate (nonmagnetic member) 9D disposed on the back surface side of the bobbin 6. The shield plate 9D is made of an electrically conductive nonmagnetic material. The shield plate 9D is made of, for example, an aluminum plate or a copper plate. The shield plate 9D includes a fourth groove 34 on the back surface side of the shield plate 9D, and the fourth groove 34 is a fourth holding portion that holds the conductive wire 7. Provided on the back surface side of the shield plate 9D are a plurality of the loop-shaped fourth grooves 34 and a plurality of fifth grooves 15 connecting the plurality of fourth grooves 34 and the first side surface (peripheral edge portion) 9d. The plurality of fourth grooves 34 form a concentric circular shape. Two fifth grooves 15 intersect in a cross shape in the middle of the fourth groove 34. Each of the two fifth grooves 15 reaches the first side surface 9d and a second side surface 9e (see FIG. 13A). In addition, one connection groove 25 connecting the plurality of fourth grooves 34 and the first side surface 9d is provided on the back surface side of the shield plate 9D. The connection groove 25 reaches the first side surface 9d and extends in parallel to the fifth groove 15. In other words, the fourth groove 34, the fifth groove 15, and the connection groove 25 are a fourth holding portion or a fifth holding portion that holds the conductive wire 7 in such a way that the conductive wire 7 passes along a loop-shaped fourth path R34, a cross-shaped fifth path R5, and a connection path R25.

Figure 12:
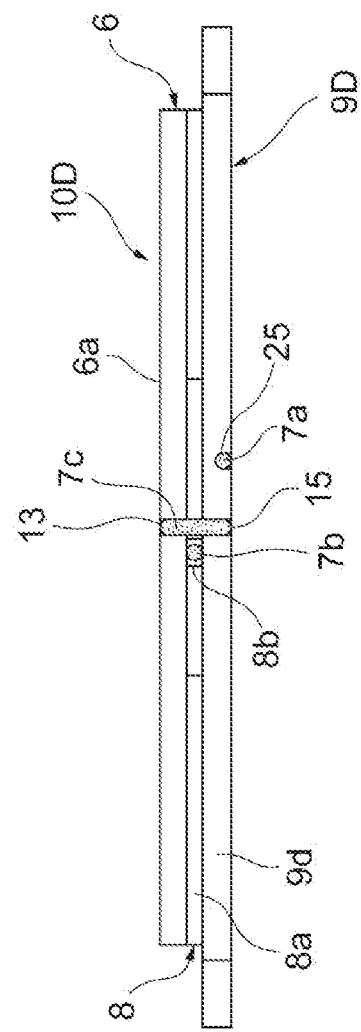
FIG. 12 is a side view of the first configuration example illustrated in FIGS. 11A and 11B.

In the coil portion 10D, the conductive wire 7 goes around to the back surface side of the shield plate 9D through the slit 9f formed in the first side surface 9d of the shield plate 9D after bypassing the outermost first groove 11 (slit 9f being at the same position as the third groove 13 of the bobbin 6). A part of the conductive wire 7 passing through the slit 9f is the front-back inverted portion 7c. In addition, after passing through the outermost fourth groove 34, the conductive wire 7 is drawn out from the first side surface 9d through one connection groove 25. The second end portion 7b is drawn out from the first side surface 6d side through the slit 8b of the ferrite portion 8. Since the position of the third groove 13, that is, the position of the slit 9f and the position of the slit 8b are somewhat shifted, interference between the front-back inverted portion 7c and the second end portion 7b is avoided (see FIG. 12).

Figure 13A:
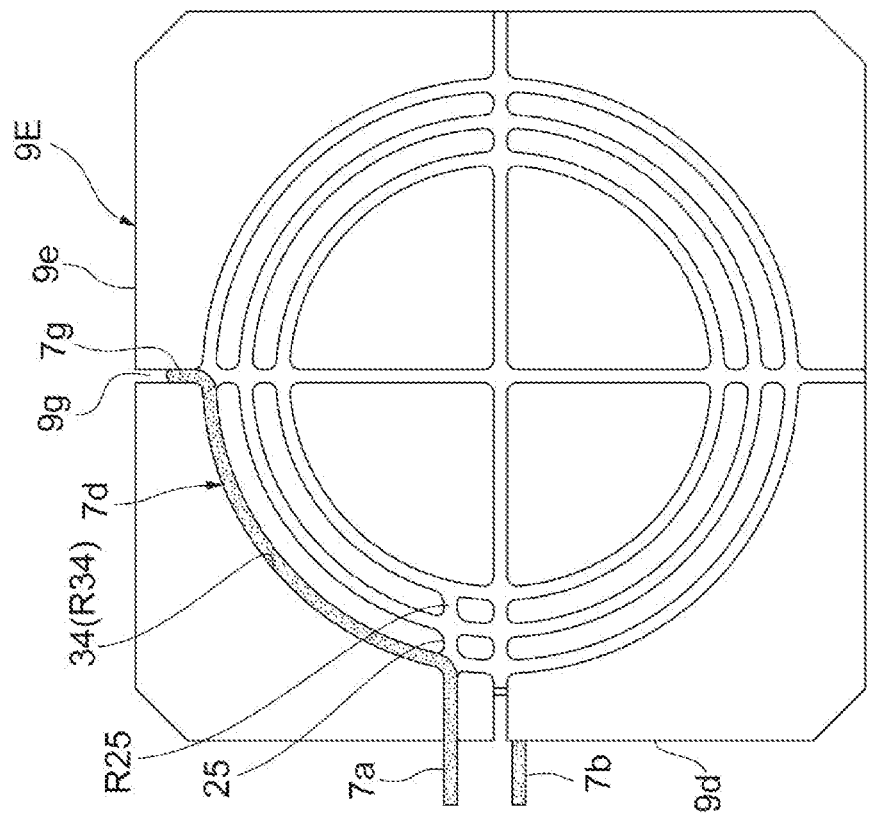
FIG. 13A is a plan view illustrating a second configuration example of the coil portion according to the third embodiment.
Figure 13B:
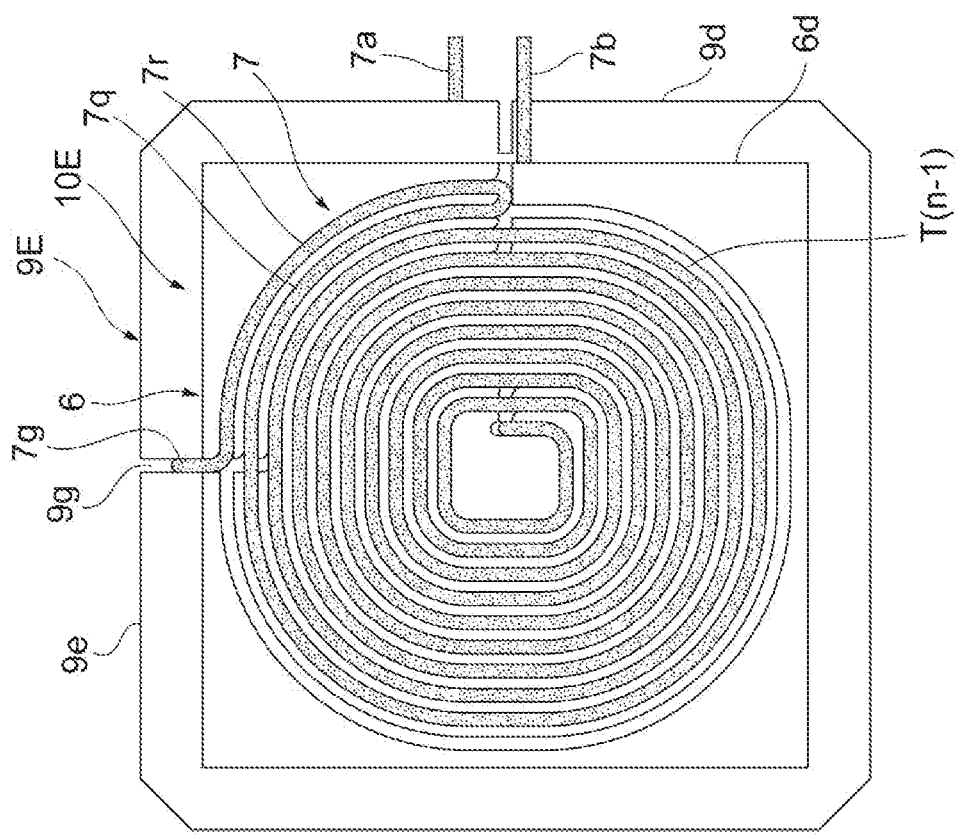
FIG. 13B is a bottom view of the second configuration example illustrated in FIG. 13A.
Figure 14:
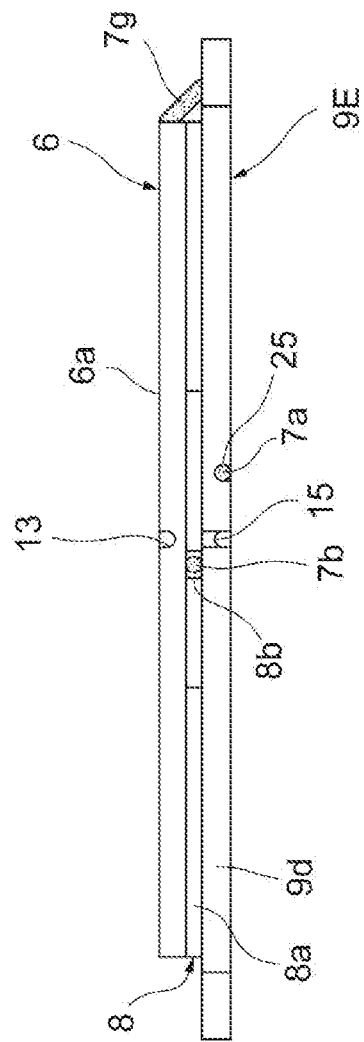
FIG. 14 is a side view of the second configuration example illustrated in FIGS. 13A and 13B.

As illustrated in FIGS. 13A and 13B, a coil portion 10E may be adopted in which the extending distance of the conductive wire 7 on the back surface side of a shield plate 9E is shortened. In the coil portion 10E, the shield plate 9E, which is the same as the shield plate 9D, is used. The coil portion 10E is provided with the third extending portion 7r folded back in the bobbin 6 and wound in the opposite direction. Subsequently, the conductive wire 7 goes around to the back surface side of the shield plate 9E through a slit 9g formed on the second side surface 9e side. The slit 9g communicates with the fifth groove 15 on the back surface side. A part of the conductive wire 7 passing through the slit 9g is a front-back inverted portion 7g. Further, the conductive wire 7 is drawn out from the first side surface 9d through one connection groove 25 after passing through the outermost fourth groove 34 by a quarter of a turn. Also in the coil portion 10E, the first end portion 7a and the second end portion 7b are drawn out in the same positional relationship as the first end portion 7a and the second end portion 7b illustrated in FIG. 12 (see FIG. 14).

The coil portion 10D and the coil portion 10E have the same action and effect as in the first embodiment. Further, even in a case where the positions and the directions of the entrances and exits of the first end portion 7a and the second end portion 7b of the conductive wire 7 are different on the bobbin 6, an extra-length conductive wire 7d can be held along the fourth paths of the shield plates 9D and 9E. Also, by a path being devised based on a proper combination between the fourth and fifth paths, the first end portion 7a and the second end portion 7b of the conductive wire 7 can be drawn out from a fixed position direction at all times. Therefore, it is possible to guide the conductive wire to a fixed position without separately ensuring an extra length accommodating space during terminal treatment (such as connectorization and terminal fixing) of the conductive wire 7 drawn out from the coil device 1.

A coil device according to a fourth embodiment will be described below. In the first to third embodiments, the circular type coil C is held by the bobbin 6. In the coil device according to the fourth embodiment, the coil C is held by the cover 3 as a holder. A groove similar to the first groove (turn accommodating groove) and the second groove (release groove) in each of the above-described embodiments can be formed on the inner surface side of the cover 3. A groove similar to the third groove (drawing groove) in each of the above-described embodiments may be formed on the inner surface side of the cover 3. In the fourth embodiment, these grooves are formed within the range of the thickness of the flat plate portion (part facing the ferrite portion 8 and the base 4) of the cover 3. An insulating plate can be disposed between the cover 3 and the ferrite portion 8. In the coil device configured as described above, the cover 3 serves as a holder as well, and thus the bobbin 6 is unnecessary. The thickness of the coil device can be reduced by the bobbin 6 being omitted. The coil device of the fourth embodiment has the same action and effect as the coil device described above.

Figure 15A:
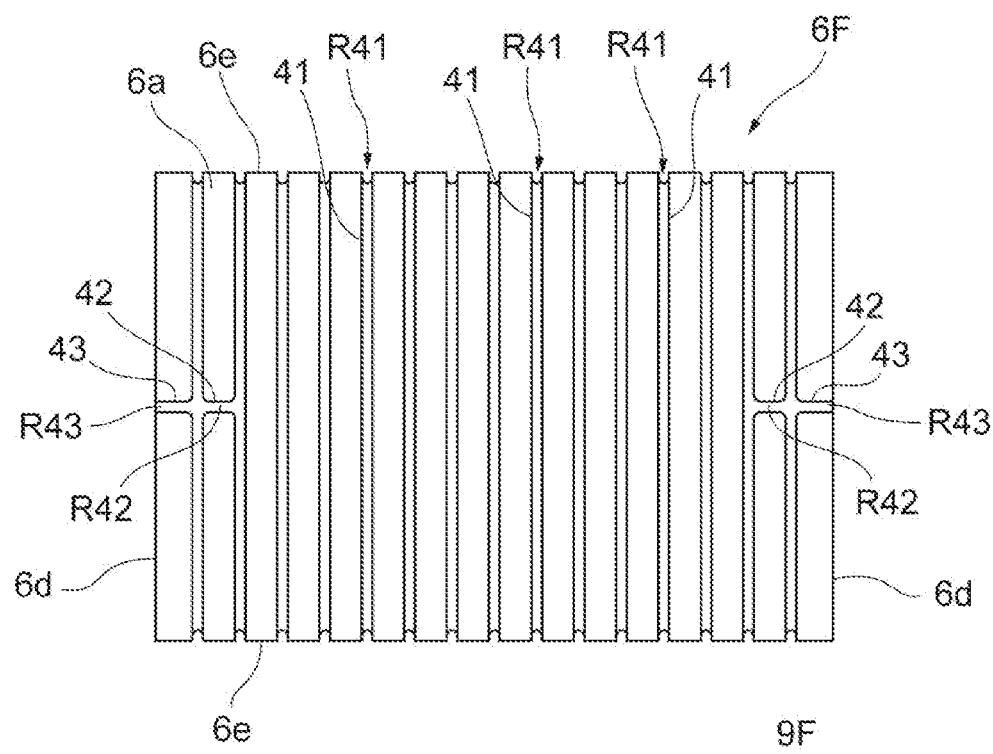
FIG. 15A is a plan view illustrating a bobbin of a coil portion according to a fifth embodiment.
Figure 15B:
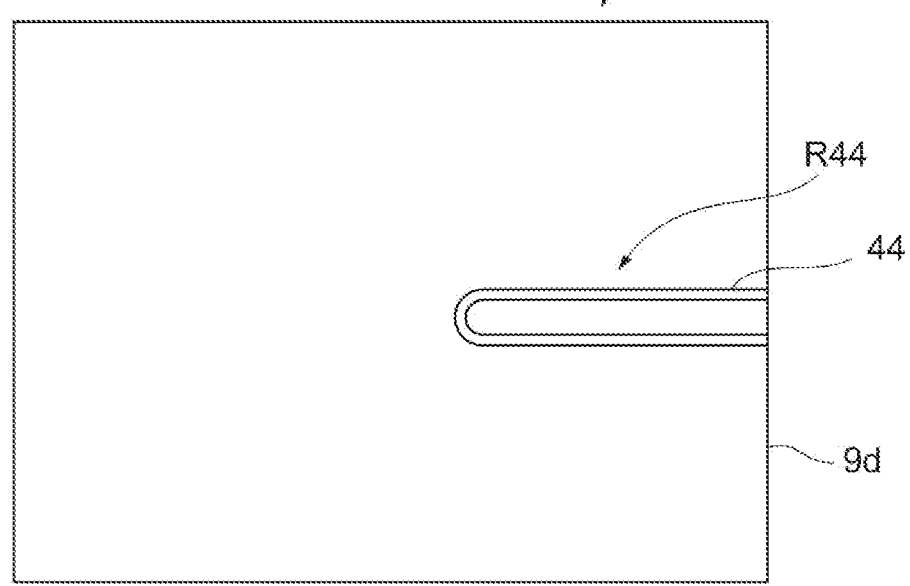
FIG. 15B is a bottom view illustrating a nonmagnetic member of the coil portion according to the fifth embodiment.

A coil portion of a coil device according to a fifth embodiment will be described below. As illustrated in FIGS. 15A and 15B, a bobbin 6F of the coil portion is a holder for a so-called solenoid type coil. The bobbin 6F includes a plurality of first grooves (first holding portion) 41 holding the conductive wire 7 in such a way that the conductive wire 7 passes along a first path R41 corresponding to a plurality of turns, a second groove (second holding portion) 42 holding the conductive wire 7 in such a way that the conductive wire 7 passes along a second path R42 connecting adjacent first paths R41, and a third groove (third holding portion) 43 holding the conductive wire 7 in such a way that the conductive wire 7 passes along a third path R43 connecting the outermost first path R41 and the first side surface (peripheral edge portion) 6d. A shield plate 9F of the coil portion includes a U-shaped fourth groove 44 on the back surface side of the shield plate 9F, and the fourth groove 44 is a fourth holding portion holding the conductive wire 7. The fourth groove 44 is a fourth holding portion that holds the conductive wire 7 in such a way that the conductive wire 7 passes along a fourth path R44. The coil device provided with the bobbin 6F and the shield plate 9F has the same action and effect as the circular type coil device described above.

Although embodiments of the present disclosure have been described above, the present invention is not limited to the embodiments described above. For example, the number and the positions of the second grooves can be set to any number and positions. In the coil portions 10, 10A, and 10B, the position where the third groove 13 is provided and the position where the third groove 33 is provided may be circumferentially shifted by any angle. The angle of shifting may be an angle such as 60 degrees, 120 degrees, and 180 degrees without being limited to a case where the angle is 90 degrees. The third groove may be provided at three or more positions in the peripheral edge portion.

The holding portion holding the conductive wire 7 is not limited to the groove form. For example, the holding portion may be, for example, a pin or a projection protruding from the surface 6a of the bobbin 6, the inner surface of the cover 3, or the like. The conductive wire 7 can be held by a plurality of projections, a plurality of pins, or the like being arranged. The holding portion may be two parallel wall portions standing on the surface 6a of the bobbin 6, the inner surface of the cover 3, or the like. The conductive wire 7 can be held by being fitted (pinched) between the two wall portions. The holding portion may be a combination between a groove and a projection, a pin, or a wall portion.

The ferrite portion 8 may be omitted. The shield plate 9 may be omitted. In that case, the fourth holding portion and the fifth holding portion may be provided on the back surface of the base 4.

The coil device of the present disclosure may be applied to a wireless power transfer system for charging a battery of a non-vehicle movable object such as an underwater vehicle. Further, the coil device of the present disclosure may be applied to a system that directly supplies electric power to an electric power-consuming component such as an electric motor and a sensor. The coil device of the present disclosure may be applied to an induction heating system and an eddy current flaw detection system.

INDUSTRIAL APPLICABILITY

According to some aspects of the present disclosure, it is possible to adjust winding of a conductive wire in a holder while suppressing an increase in the number of parts.

REFERENCE SIGNS LIST

1: coil device, 2: housing, 3: cover, 4: base, 6: bobbin (holder), 6a: surface, 6d: first side surface, 6e: second side surface, 7: conductive wire, 7a: first end portion, 7b: second end portion, 8: ferrite portion, 9C, 9D, 9E, 9F: shield plate (nonmagnetic member), 9d: first side surface, 9e: second side surface, 10, 10A, 10B, 10C, 10D, 10E: coil portion, 11: first groove (first holding portion), 12: second groove (second holding portion), 13: third groove (third holding portion), 14: fourth groove (fourth holding portion), 15: fifth groove (fifth holding portion), 22: second groove (second holding portion), 24: connection groove, 25: connection groove, 32: second groove (second holding portion), 33: third groove (third holding portion), 34: fourth groove (fourth holding portion), 41: first groove (first holding portion), 42: second groove (second holding portion), 43: third groove (third holding portion), 44: fourth groove (fourth holding portion), C: coil, R1: first path, R2: second path, R3: third path, R4: fourth path, R5: fifth path, R22: second path, R24: connection path, R25: connection path, R32: second path, R33: third path, R34: fourth path, R41: first path, R42: second path, R43: third path, R44: fourth path, T: turn.

The invention claimed is:

1. A coil device comprising:
    a coil; and
    a holder holding the coil,
    wherein the coil is formed by a conductive wire wound in a plurality of turns adjacent each other,
    wherein the holder includes:
        a plurality of first holding portions holding the conductive wire in such a way that the conductive wire passes along a plurality of first paths corresponding to the plurality of turns; and
        at least one second holding portion holding the conductive wire in such a way that the conductive wire passes along a second path extending in a direction intersecting and connecting the first paths; and
    a nonmagnetic shield disposed on a back surface side of the holder,
    wherein the nonmagnetic shield includes a shield holding portion holding a segment of the conductive wire on a back surface side of the nonmagnetic shield thereby shielding the segment with respect to power feeding performance conducted via the conductive wire held by the first and second holding portions of the holder.

2. The coil device according to claim 1, wherein the holder further includes a third holding portion holding the conductive wire in such a way that the conductive wire passes along a third path connecting a peripheral edge portion of the holder and the outermost first path closest to the peripheral edge portion among the plurality of first paths.

3. The coil device according to claim 1, wherein the conductive wire is wound in opposite directions in two of the first paths adjacent to each other after passing along the second path.

4. The coil device according to claim 1,
    wherein the shield holding portion is provided in such a way that the conductive wire is capable of passing along a plurality of loop-shaped paths, and passes along a path connecting the plurality of loop-shaped paths and a peripheral edge portion of the nonmagnetic shield.

5. The coil device according to claim 1,
    wherein the holder includes a first groove as the first holding portion configured to receive the conductive wire and a second groove as the second holding portion configured to receive the conductive wire, and
    wherein the first groove and the second groove are formed on a surface side or the back surface side of the holder.

6. A holder holding a coil including a conductive wire, the holder comprising:
    a plurality of first holding portions holding the conductive wire in such a way that the conductive wire passes along first paths corresponding to a plurality of turns adjacent each other in a spiral-like form; and
    at least one second holding portion holding the conductive wire in such a way that the conductive wire passes along a second path extending in a direction intersecting and connecting the first paths; and
    a nonmagnetic shield disposed on a back surface side of the holder that includes a shield holding portion holding a segment of the conductive wire on a back surface side of the nonmagnetic shield thereby shielding the segment with respect to power feeding performance conducted via the conductive wire held by the first and second holding portions of the holder.

7. The coil device according to claim 6, wherein the shield holding portion includes a groove configured to receive the conductive wire.

8. The coil device according to claim 1, wherein the shield holding portion includes a groove configured to receive the conductive wire.

* * * * *